United States Patent [19]
Eswarakrishnan et al.

[11] Patent Number: 5,630,922
[45] Date of Patent: May 20, 1997

[54] ELECTRODEPOSITABLE COATING COMPOSITION CONTAINING DIORGANOTIN DICARBOXYLATES

[75] Inventors: Venkatachalam Eswarakrishnan; Robert R. Zwack, both of Allison Park; Gregory J. McCollum, Gibsonia; Raphael O. Kollah; Steven R. Zawacky, both of Pittsburgh, all of Pa.

[73] Assignee: PPG Industries, Inc., Pittsburgh, Pa.

[21] Appl. No.: 578,821

[22] Filed: Dec. 26, 1995

[51] Int. Cl.$^6$ .................. C25D 13/00; C25D 15/00; C08L 63/00

[52] U.S. Cl. .............. 204/499; 204/500; 204/501; 204/502; 204/504; 204/505; 204/506; 204/507; 523/415

[58] Field of Search .................. 204/471, 499, 204/500, 501, 502, 504, 505, 506, 507; 523/415

[56] References Cited

U.S. PATENT DOCUMENTS

| | | | |
|---|---|---|---|
| 3,455,806 | 7/1969 | Spoor et al. | 204/181 |
| 3,663,389 | 5/1972 | Koral et al. | 204/181 |
| 3,663,398 | 5/1972 | Christenson et al. | 204/181 |
| 3,793,278 | 2/1974 | DeBona | 260/29.2 EP |
| 3,922,253 | 11/1975 | Jerabek et al. | 260/77.5 TB |
| 3,928,157 | 12/1975 | Suematsu et al. | 204/181 |
| 3,947,338 | 3/1976 | Jerabek et al. | 204/181 |
| 3,947,339 | 3/1976 | Jerabek et al. | 204/181 |
| 3,959,106 | 5/1976 | Bosso et al. | 204/181 |
| 3,984,299 | 10/1976 | Jerabek | 204/181 |
| 4,007,154 | 2/1977 | Schimmel et al. | 260/37 EP |
| 4,031,050 | 6/1977 | Jerabek | 260/29.2 TN |
| 4,058,544 | 11/1977 | Kushlefsky | 260/429.7 |
| 4,104,147 | 8/1978 | Marchetti et al. | 204/181 C |
| 4,148,772 | 4/1979 | Marchetti et al. | 260/29.2 EP |
| 4,423,166 | 12/1983 | Moriarity et al. | 523/414 |
| 4,432,850 | 2/1984 | Moriarity et al. | 204/181 |
| 4,468,307 | 8/1984 | Wismer et al. | 204/181 C |
| 4,554,185 | 11/1985 | Lane et al. | 427/385.5 |
| 4,579,886 | 4/1986 | Otsuki et al. | 523/404 |
| 4,596,724 | 6/1986 | Lane et al. | 427/385.5 |
| 4,711,917 | 12/1987 | McCollum et al. | 523/415 |
| 4,891,111 | 1/1990 | McCollum et al. | 204/181.7 |
| 4,931,157 | 6/1990 | Valko et al. | 204/181.7 |
| 4,968,455 | 11/1990 | Landsiedel et al. | 260/407 |
| 4,981,924 | 1/1991 | Nichols et al. | 523/415 |
| 4,994,507 | 2/1991 | Debroy et al. | 523/415 |
| 5,066,689 | 11/1991 | Patzschke et al. | 523/415 |
| 5,071,904 | 12/1991 | Martin et al. | 524/458 |
| 5,084,506 | 1/1992 | Faler et al. | 524/597 |
| 5,096,556 | 3/1992 | Corrigan et al. | 204/181.7 |
| 5,356,529 | 10/1994 | Eswarakrishnan et al. | 205/224 |
| 5,430,078 | 7/1995 | Hoppe-Hoeffler et al. | 523/414 |

FOREIGN PATENT DOCUMENTS

| | | |
|---|---|---|
| 262722 | 7/1991 | European Pat. Off. . |
| 448746 | 10/1991 | European Pat. Off. . |

OTHER PUBLICATIONS

"Preparation of Dibutyltin Organic Salts" by N. I. Sheverdina, L. V. Abramova, I. E. Paleeva and K. A. Kocheshkov. Khim. Prom. no month 1962 (10), 707–8 Chemical Abastracts 59, 8776C.

"Encyclopedia of Chemical Technology", Kirk-Othmer, 2nd Ed., no month (1969) vol. 20, pp. 318–323.

Primary Examiner—Kathryn L. Gorgos
Assistant Examiner—Edna Wong
Attorney, Agent, or Firm—Kenneth J. Stachel; Krisanne Shideler; William J. Uhl

[57] ABSTRACT

An electrodepositable composition is provided comprising (a) an active hydrogen-containing, cationic salt group-containing resin electrodepositable on a cathode; (b) a capped polyisocyanate curing agent; and (c) a diorganotin dicarboxylate; wherein the dicarboxylate is at least one long chain carboxylate having from 14 to 22 carbon atoms and the diorganotin dicarboxylate is present in the electrodepositable composition in an amount of at least 0.01 percent by weight tin based on weight of total solids of the electrodepositable composition. The composition provides improved storage stability without precipitation of dibutyltin oxide, and when electrodeposited over conductive substrates, there is no loss of cure response and appearance properties.

21 Claims, No Drawings

ELECTRODEPOSITABLE COATING COMPOSITION CONTAINING DIORGANOTIN DICARBOXYLATES

FIELD OF THE INVENTION

The present invention relates to cationic electrodepositable compositions and to their use in electrodeposition.

The application of a coating by electrodeposition involves depositing a film-forming composition to an electrically conductive substrate under the influence of an applied electrical potential. Electrodeposition has gained prominence in the coatings industry because in comparison with non-electrophoretic coating methods, electrodeposition provides higher paint utilization, outstanding corrosion resistance, and low environmental contamination. Early attempts at commercial electrodeposition processes used anionic electrodeposition where the workpiece being coated served as the anode. However, in 1972, cationic electrodeposition was introduced commercially. Since that time, cationic electrodeposition has become increasingly popular and today is the most prevalent method of electrodeposition. Throughout the world, more than 80 percent of all motor vehicles manufactured are given a primer coating by cationic electrodeposition.

Many cationic electrodeposition compositions used today are based on active hydrogen-containing resins derived from a polyepoxide and a capped polyisocyanate curing agent. These cationic electrodeposition compositions conventionally contain solid organotin catalysts such as dibutyltin oxide to activate cure of the electrodeposition composition. Because these organotin catalysts are solids at room temperature, they can be difficult to incorporate into the electrodeposition composition, requiring milling with a dispersing vehicle to form a paste which is added to the electrodeposition composition. The milling operation requires additional time, labor and equipment, and adds to the cost of preparing the electrodeposition composition. One alternative to milling the dibutyltin oxide is to incorporate a liquid dibutyltin oxide derivative, such as dibutyltin diacetate, in the electrodeposition coating. Electrodeposition compositions containing these types of catalysts are often not storage stable and over time they tend to hydrolyze and result in precipitation of solid tin compounds.

It would be desirable to provide an electrodepositable composition which demonstrates enhanced storage stability without loss of cured film properties or appearance and which contains catalysts that complement such enhanced storage stability and that do not have the shortcomings of those of the prior art.

SUMMARY OF THE INVENTION

In accordance with the present invention, an electrodepositable composition is provided comprising (a) an active hydrogen-containing, ionic salt group-containing resin electrodepositable on a substrate as the electrode; (b) a capped polyisocyanate curing agent; and (c) a diorganotin dicarboxylate; wherein at least one of the dicarboxylates is a residue of a long chain carboxylic acid having from 14 to 22 carbon atoms and the diorganotin dicarboxylate is present in the electrodepositable composition in an amount of at least 0.01 percent by weight tin based on weight of total solids of the electrodepositable composition.

DETAILED DESCRIPTION

The ionic resin of component (a) (hereinafter referred to as "Component A", where appropriate) includes both anionic and cationic resins known to those skilled in the art. The cationic resins are preferred for electrodeposition onto the substrate as a cathode because these resins usually provide superior corrosion resistance. Component A is preferably derived from a polyepoxide, which may be chain extended by reacting together a polyepoxide and a polyhydroxyl group-containing material selected from alcoholic hydroxyl group-containing materials and phenolic hydroxyl group-containing materials to chain extend or build the molecular weight of the polyepoxide. The resin contains cationic salt groups and active hydrogen groups selected from aliphatic hydroxyl and primary and secondary amino. Such cationic resins can be as those described in U.S. Pat. Nos. 3,663,389; 3,922,253; 3,984,299; 3,947,339; 3,947,388; and 4,031,050.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i.e., epoxy:polyhydroxyl group-containing material is typically from about 1.00:0.75 to 1.00:2.00.

The polyepoxide preferably has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. The preferred polyepoxides have molecular weights ranging from about 180 to 500, preferably from about 186 to 350. Epoxy group-containing acrylic polymers can also be used but they are not preferred.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

The active hydrogen-containing cationic resin also contains cationic salt groups. The cationic salt groups are preferably incorporated into the resin by reacting the epoxy group-containing resinous reaction product prepared as described above with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

Mixtures of the above-mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50° C. to 150° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. Sulfamic acid is preferred. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably, the reaction temperature is in the range of about 60° C. to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water.

In addition to resins containing amine salts and quaternary ammonium salt groups, cationic resins containing ternary sulfonium groups may be used in forming the active hydrogen-containing cationic resin in the composition of the present invention. Examples of these resins and their method of preparation are described in U.S. Pat. Nos. 3,793,278 to DeBona and 3,959,106 to Bosso et al.

The extent of cationic salt group formation should be such that when the resin is mixed with an aqueous medium and the other ingredients, a stable dispersion of the electrodepositable composition will form. By "stable dispersion" is meant one that does not settle or is easily redispersible if some settling occurs. Moreover, the dispersion should be of sufficient cationic character that the dispersed particles will migrate toward and electrodeposit on a cathode when an electrical potential is set up between an anode and a cathode immersed in the aqueous dispersion.

Generally, the active hydrogen-containing cationic resin of the electrodepositable composition of the present invention is non-gelled and contains from about 0.1 to 3.0, preferably from about 0.1 to 0.7 milliequivalents of cationic salt group per gram of resin solids. The number average molecular weight of the active hydrogen-containing cationic resin preferably ranges from about 2,000 to about 15,000, more preferably from about 5,000 to about 10,000. By "non-gelled" is meant that the resin is substantially free from crosslinking, and prior to cationic salt group formation, the resin has a measurable intrinsic viscosity when dissolved in a suitable solvent. In contrast, a gelled resin having an essentially infinite molecular weight would have an intrinsic viscosity too high to measure.

The active hydrogens within the active hydrogen-containing cationic resin include any active hydrogens which are reactive with isocyanates within the temperature range of about 93° C. to 204° C., preferably about 121° C. to 177° C., as are known to those skilled in the art. Most often, the active hydrogens are selected from the group consisting of hydroxyl and primary and secondary amino, including mixed groups such as hydroxyl and primary amino. Preferably, the active hydrogen-containing cationic resin will have an active hydrogen content of about 1.7 to 10 milliequivalents, more preferably about 2.0 to 5 milliequivalents of active hydrogen per gram of resin solids.

Besides the epoxy-amine reaction product as the active hydrogen cationic-salt containing resin, active hydrogen-containing ionic resins also can be selected from cationic acrylic resins such as those described in U.S. Pat. Nos. 3,455,806 and 3,928,157. Further active cationic polyester resins, and the like, which contain ionic groups and active hydrogen groups.

Typically, the active hydrogen-containing cationic resin as Component A is present in the electrodepositable composition in amounts of about 50 to 75, preferably about 55 to 70 percent by weight based on weight of main vehicle resin solids. By "main vehicle resin solids" is meant resin solids attributable to the active hydrogen-containing, cationic salt group-containing resin of Component A and the polyisocyanate curing agent of Component B so that the total amounts of these components equals 100 percent by weight.

The electrodepositable composition of the present invention also contains a capped polyisocyanate curing agent. The polyisocyanate curing agent of component (b) (hereinafter referred to as "Component B", where appropriate) may be a fully capped polyisocyanate with substantially no free isocyanate groups, or it may be partially capped and reacted with the resin backbone as described in U.S. Pat. Nos. 3,984,299 and 5,356,529. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. suitable higher polyisocyanates are triphenylmethane-4,4', 4"-triisocyanate, 1,2,4-benzene triisocyanate and polymethylene polyphenyl isocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable aliphatic, cycloaliphatic, or aromatic alkyl monoalcohol or phenolic compound may be used as a capping agent for the capped polyisocyanate curing agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime, lactams such as epsilon-caprolactam, and amines such as dibutyl amine.

The capped polyisocyanate curing agent of Component B is typically present in the electrodepositable composition in amounts of about 25 to 50, preferably about 30 to 45 percent by weight based on weight of main vehicle resin solids. Typically, there is sufficient polyisocyanate present in the composition of the present invention to provide about 0.1 to about 1.2 capped isocyanate groups for each active hydrogen in the cationic resin of Component A.

Organotin catalysts are also present in the electrodepositable composition of the present invention, preferably in the form of a liquid which is easily incorporated into the composition of the present invention. Conventional catalysts, which are often solids, are typically dispersed in a conventional pigment grinding vehicle, such as those disclosed in U.S. Pat. No. 4,007,154, by a grinding or milling process. The organotin catalyst in the composition of the present invention is a diorganotin dicarboxylate which can be depicted structurally as shown in (I):

where the structure is a schematic in that the bonds are not intended to depict actual bond angles.

In structure (I), any two of the organo groups $R_1$, $R_2$, $R_3$, and $R_4$ (collectively referred to as "R" groups) are the same or different, saturated or unsaturated, linear or branched, carboxylate radicals at least one of which contains from 14 to 22 carbon atoms (referred to as "long chain carboxylate"), preferably from 14 to 18 carbon atoms, and most preferably from 16 to 18 carbon atoms. A carboxylate radical is the structure that results from removal of the hydrogen atom from the carboxylate group of the carboxylic acid. Specific examples of suitable long chain carboxylates are oleate, palmitate, stearate, myristate, 9,11-octadecadienoate, and unsaturated natural or synthetic monobasic aliphatic fatty carboxylates and natural higher fatty carboxylates such as soybean oil fatty carboxylates, and tall oil fatty carboxylates including mixtures thereof. For example, the appropriate aforementioned carboxylates are derivatives of their counterpart carboxylic acid such as the group consisting of oleic acid, palmitic acid, stearic acid, myristic acid, 9,11-octadecadienoic acid, and mixtures thereof and the other carboxylic acids known to those skilled in the art as counterparts to the appropriate aforementioned carboxylates. The other alkyl chain carboxylates that are not the long chain acids ("other carboxylic acid") can be carboxylates such as those having 13 or fewer carbon atoms including: acetate acid, propionate butanoate and the like. Also, carboxylates from unsaturated acids including ethylenically unsaturated monocarboxylates like crotonate, isocrotonate, 3-butenoate, 1-cyclohexene-1-carboxylate, and cinnamate, and unsaturated acids such as abietate and those that are extracted from rosin and other natural products.

As depicted in structure (I), the other two "R" organo groups of $R_1$, $R_2$, $R_3$, and $R_4$ that are not the dicarboxylates are the same or different alkyl; cycloalkyl such as cyclohexyl, aryl, such as phenyl; and substituted alkyl and aryl in which the substituents do not adversely affect the curing reaction such as alkaryl like tolyl and aralkyl such as benzyl. Specific examples of alkyl groups in the diorganotin dicarboxylate include hydrocarbon radicals having from 1 to 10 carbon atoms, Such as methyl, ethyl, propyl, butyl, and octyl.

Preferably, the organotin compound of the present invention has as depicted in schematic structure (I) two of the "R" organo groups of $R_1$, $R_2$, $R_3$, and $R_4$ as dicarboxylates that are the same long chain carboxylate and most preferably this is oleate. Also, the two non-carboxylate "R" organo groups are preferably the same alkyl group and more preferably the butyl group.

The diorganotin dicarboxylate that is component (c) may be prepared by reacting the one or more different types of carboxylic acid compound where at least one is the long chain carboxylic acid with a diorganotin compound such as dibutyltin oxide in a mole ratio greater than about 1:1; preferably about 2 to 1. Higher mole ratios can be used but are not particularly advantageous since use of excess amounts of the carboxylic acid yields unreacted carboxylic acid. The diorganotin dicarboxylate as component (c) may also be prepared by reacting the long chain carboxylic acid and the other carboxylic acids with a diorganotin oxide such as dibutyltin oxide in a mole ratio of carboxylic acids to diorganotin oxide greater than about 1:1. Again, the preferred mole ratio is around 2:1 with higher mole ratios resulting in diminishing returns because of the presence of unreacted excess carboxylic acid. It is to be understood that the term "dicarboxylate" is meant to include not only a tin complex having two carboxylate groups, but also a mixture represented by the statistical mixture of reaction products obtained from the reaction of at least one of the long chain carboxylic acids, or the reaction of at least one of the long chain carboxylic acids and other carboxylic acids, with a diorganotin compound in a mole ratio of carboxylic acids to diorganotin compound greater than about 1:1. When mixtures of the long chain and other carboxylic acids are used, an amount of the long chain carboxylic acid is always present and it is particularly suitable that such an amount is a predominant amount such as around 50 weight percent or greater of the mixture of carboxylic acid reactants.

The diorganotin dicarboxylates like dibutyltin dioleate are available from Pfaltz and Bauer, Inc., a Division of Aceto Chemical Co., Inc. (Waterbury, Conn.). Also, any method known to those skilled in the art to produce the diorganotin dicarboxylates like dialkyltin dicarboxylates can be used. For instance, in a suitable reaction, the diorganotin compound can be combined with the long chain carboxylic acid alone or in combination with the one or more other carboxylic acids in the aforementioned appropriate molar ratio to a reaction vessel with a nitrogen atmosphere. The mixture is heated at elevated temperatures and at appropriate pressures to facilitate the removal of the water produced by the reaction. Suitable temperatures include those in the range of from around 100° C. to around 180° C. and preferably around 140° C. for the aforementioned preferred reactants for a sufficient period of time to give a good yield of the diorganotin dicarboxylate. One suitable manner of removing the water formed from the reaction is by distillation. Other suitable methods include those of preparing diorganotin dicarboxylates as shown in "Preparation of Dibutyltin Organic Salts" by N. I. Sheverdina, L. V. Abramova, I. E. Paleeva, and K. A. Kocheshkov. Khim. Prom. 1962 (10), 707–8 Chemical Abstracts 59, 8776C, which is hereby incorporated by reference.

Also, the reaction between the long chain or long chain and at least one other carboxylic acid and the diorganotin compound optionally can be conducted in any organic medium. A nonexclusive example includes the reaction of the diorganotin compound, like dipropyltin oxide, diphenyltin oxide, or dicyclohexyltin hydroxide in 0 xylene with the long chain or long chain and other carboxylic acids. The components are heated to the boiling point of xylene and the water of reaction is simultaneously distilled off azeotropically through a bridge or other suitable distillation apparatus known to those skilled in the art for removal of the water. Also with the use of xylene or other diluent like inert liquid diluent such as an aromatic hydrocarbons, which form an azeotropic mixture with water, a portion of this material may possibly be removed together with the water. Also, the carboxylic acids can be reacted with diorganotin oxide, diorganotin hydroxide, or diorganotin chloride in a solvent or diluent or without the use of either. With the use of the solvent or diluent, the water formed as a by-product of the reaction is conventionally removed by distillation which is conducted under either atmospheric or reduced pressure.

The diorganotin dicarboxylate may be incorporated into the electrodepositable composition in several ways. It may be added to the final reaction mixture of the main vehicle, i.e., the active hydrogen-containing resin, just before solubilization with water and acid as described above. Alternatively, it may be added to a partially solubilized resin kept at high enough solids so as to be sheared into the final composition. Additionally, it may be co-dispersed with polyepoxide-polyoxyalkylene-polyamine modifying anticrater resins such as those described in U.S. Pat. No. 4,423,166. It may also be added as a component of a pigment paste via addition to a conventional pigment grinding vehicle such as those disclosed in U.S. Pat. No. 4,007,154.

In a particularly preferred embodiment, the diorganotin dicarboxylate is incorporated into the electrodepositable composition in the form of a stable emulsion. Such an emulsion may be prepared by mixing the dioganotin dicarboxylate with a nonionic and/or cationic surfactant in an aqueous acidic solution. The resulting mixture is subjected to high shear stress using a homogenizer, thereby forming a stable dispersion of diorganotin dicarboxylate microparticles in aqueous medium. Any high shear stress homogenizer for preparing emulsions known to those skilled in the art can be used such as that described in U.S. Pat. Nos. 5,084,506 (Faler et al.) and 5,071,904 (Martin et al.). Examples of suitable surfactants include Rhodameen C-5, a surfactant available from Rhone-Poulenc, Specialty Chemicals Ltd. in their line of ethoxylated amine and/or amides with tertiary amines and ethoxylates of primary tallow amines which is a liquid with a yellow brown appearance, a cloud point at 1% of 40–70, a Gardner color of 12 maximum, a tertiary amine percentage of 95 minimum, a water content of 0.5% maximum, a hydroxyl value of 265–285, a neutralization equivalent of 420–440 and per million, if prepared without a catalyst, of 200 minimum. With the use of such suitable surfactants, the diorganotin dicarboxylates of the present invention can be more easily prepared with the homogenizer to produce water-dilutable formulations. Also, emulsifiable concentrates can be prepared by solution of the diorganotin dicarboxylate in an inert organic solvent such as alcohols, ketones, cyclohexanone, xylene or higher boiling aromatic compounds with the addition of one or more emulsifiers. When the diorganotin dicarboxylate are liquids, the amount of solvent can be reduced or omitted entirely. Other possible suitable surfactants are, for example, hexadecyltrimethylammonium bromide, and non-ionic emulsifiers such as fatty acid polyglycol esters, alkylaryl polyglycol ethers, fatty alcohol polyglycol ethers, propylene oxide-ethylene oxide-condensation products, and alkyl polyglycol ethers.

Unlike conventional solid organotin catalysts such as dibutyltin oxide and liquid organotin catalysts of the prior art such as dibutyltin diacetate and dibutyltin dilaurate, the dialkyltin dicarboxylate used in the electrodepositable composition of the present invention does not cause precipitation of solids such as dibutyltin oxide from the composition over time. The compositions of the present invention are heat stable and storage stable.

The diorganotin dicarboxylate of component (c) is present in the electrodepositable composition of the present invention in amounts of at least about 0.01 percent by weight tin based on the weight of the total solids of electrodepositable composition, preferably about 0.01 to 1.5 percent tin by weight, and more preferably about 0.1 to 0.5 percent tin by weight. When the dibutyltin dicarboxylate is incorporated into the electrodepositable composition in the form of a stable homogenized emulsion as described above, it is preferably present in amounts of about 0.1 to 0.3 percent tin by weight, based on weight of the total solids of the electrodepositable composition.

In a particularly preferred embodiment, the diorganotin dicarboxylate of component (c) is present in the composition in combination with dibutyltin oxide. In this embodiment, the respective amounts of diorganotin dicarboxylate and dibutyltin oxide are such that weight ratio of tin in the diorganotin dicarboxylate to the tin in the dibutyltin oxide is in a ratio of about 0.25:0.6 and preferably 0.3:0.5 based on total solids.

The composition of the present invention is preferably used in an electrodeposition process in the form of an aqueous dispersion. By "dispersion" is meant a two-phase transparent, translucent, or opaque aqueous resinous system in which the resin, curing agent, pigment, and water insoluble materials are the dispersed phase and water and water soluble materials comprise the continuous phase. The dispersed phase has an average particle size less than about 10 microns, preferably less than 5 microns. The aqueous dispersion preferably contains at least about 0.05 and usually about 0.05 to 50 percent by weight resin solids, depending on the particular end use of the dispersion.

The aqueous dispersion may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as 4-methyl-2-pentanone (MIBK) and isophorone. The coalescing solvent is usually present in an amount up to about 40 percent by weight, preferably ranging from about 0.05 to 25 percent by weight based on total weight of the aqueous medium.

The electrodepositable composition of the present invention may further contain pigments and various other optional additives such as catalysts, plasticizers, surfactants, wetting agents, defoamers, and anti-cratering agents.

Examples of suitable surfactants and wetting agents include alkyl imidazolines such as those available from Geigy Industrial Chemicals as GEIGY AMINE C, and acetylenic alcohols available from Air Products and Chemicals as SURFYNOL 104. Examples of defoamers include a hydrocarbon containing inert diatomaceous earth available from Crucible Materials Corp. as FOAMKILL 63. Examples of anti-cratering agents are polyoxyalkylene-polyamine reaction products such as those described in U.S. Pat. No. 4,432,850. These optional ingredients, when present, are usually used in an amount up to 30 percent by weight, typically about 1 to 20 percent by weight based on weight of resin solids.

Suitable pigments include, for example, iron oxides, carbon black, coal dust, titanium dioxide, talc, clay, and barium sulfate. Lead pigments may also be used. The pigment content of the aqueous dispersion, generally expressed as the pigment to resin (or binder) ratio (P/B) is usually about 0.1:1 to 1:1.

In the process of electrodeposition, the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electro-conductive substrate, especially metal substrates such as steel, zinc, aluminum, copper, magnesium or the like can be coated with the electrodepositable composition of the present invention. Steel substrates are preferred because the composition provides significant corrosion protection to these substrates. Although it is conventional to pretreat the steel substrate with a phosphate conversion coating followed by a chromic acid rinse, the composition of the present invention may be applied to steel substrates which have not been given a chrome rinse and still provides excellent corrosion resistance.

After deposition, the coating is heated to cure the deposited composition. The heating or curing operation is usually carried out at a temperature in the range of from 120° C. to 250° C., preferably from 120° C to 190° C. for a period of time ranging from 10 to 60 minutes. The thickness of the resultant film is usually from about 10 to 50 microns.

The composition can be applied by means other than electrodeposition including brushing, dipping, flow coating, spraying and the like, but it is most often applied by electrodeposition.

The invention will be further described by reference to the following examples. Unless otherwise indicated, all parts are by weight.

EXAMPLES

TABLE 1

Production of Cationic Electrodepositable Main Vehicle Resin

| Ingredients | Examples | | | | |
| --- | --- | --- | --- | --- | --- |
| | A | B | C | D | E |
| EPON 828[1] | 614.68 | 614.68 | 614.68 | 614.68 | 115.9 |
| Bisphenol A | 265.42 | 265.42 | 265.42 | 265.42 | 50.0 |
| Bisphenol A - ethylene oxide adduct (1:6 molar ratio) | 250 | 250 | 250.00 | 250 | 47.11 |
| Methyl isobutyl ketone | 59.48 | 59.48 | 59.48 | 59.48 | 10.315 |
| Ethyltriphenyl phosphonium iodide | 0.6 | 0.6 | 0.6 | 0.6 | 0.11 |

TABLE 1-continued

Production of Cationic Electrodepositable Main Vehicle Resin

| Ingredients | Examples | | | | |
|---|---|---|---|---|---|
| | A | B | C | D | E |
| Crosslinker[2] | 682.85 | 683.08 | 682.85 | 683.10 | 128.8 |
| Diketimine[3] | 56.01 | 56.56 | 56.01 | 56.62 | 9.846 |
| N-methyl ethanol amine | 48.68 | 48.68 | 48.68 | 48.68 | 9.18 |
| Dibutyltin dilaurate | 61.59 | — | — | — | |
| Dibutyltin dioleate[4] | | 87.55 | | 76.86 | 4.935 |
| Oleic acid | 18.66 | — | — | — | |

[1]Polyglycidyl ether of Bisphenol A, available from Shell Oil and Chemical Co.
[2]The capped polyisocyanate crosslinker was prepared from the following mixture of main ingredients discounting any trace materials that may be present:

| COMPONENTS | PARTS BY WEIGHT |
|---|---|
| Polyisocyanate* | 1325 |
| Methyl isobutyl ketone | 221.81 |
| 2-(2-Butoxyethoxy)ethanol | 162.23 |
| Dibutyltin dilaurate | 0.2 |
| 2-Butoxy ethanol | 1063.62 |

*polymeric MDI available from Miles Inc. as MONDUR MR.
The polyisocyanate, methyl isobutyl ketone and dibutyltin dilaurate were charged to a reaction flask under a nitrogen atmosphere. 2-(2-Butoxyethoxy) ethanol was added slowly allowing the reaction to exotherm to a temperature between 45° C. to 50° C. Upon completion of the addition, the reaction mixture was held at 50° C. for 30 minutes. The 2-butoxy ethanol was added and the mixture allowed to exotherm 110° C. and held there until Infrared analysis indicated no unreacted NCO remained.
[3]Diketimine derived from diethylenetriamine and methyl isobutyl ketone (73% solids in methyl isobutyl ketone).
[4]Dibutyltin dioleate was prepared from the following mixture of ingredients:
Dibutyltin oxide 2315.29
Oleic acid[1] 5254.71
[1]Commercial oleic acid sold under the trademark of EMERSOL 210 oleic acid and mixture of other fatty acids by Emery Group of Henkel Corporation, which is reported as composed of 71% oleic acid, 8% linoleic acid, 6% palmitoleic acid, 5% palmitic acid, 4% myristoleic acid, 3% myristic acid and 1% of each of margaric acid, stearic acid and linolenic acid).
Dibutyltin oxide and oleic acid were charged to a reaction flask under a nitrogen atmosphere and the mixture heated to 140° C. and water formed from the reaction was removed by distillation to give dibutyltin dioleate. In this particular resin, it was added as a solution in MIBK (90% solids).

RESIN EXAMPLE A

Describes the preparation of a cationic electrodeposition main vehicle containing dibutyltin dilaurate. The EPON 828, bisphenol A-ethylene oxide adduct, bisphenol A and methyl isobutyl ketone were charged to a reaction vessel and heated under a nitrogen atmosphere to 125° C. Ethyl triphenyl phosphonium iodide then was added and the reaction mixture allowed to exotherm to about 145° C. The reaction was held at 145° C. for two hours and an epoxy equivalent was obtained. Epoxy equivalent usually stalls close to the target epoxy equivalent weight. At this point, the crosslinker, the diketimine and N-methylethanolamine were added in succession. The mixture was allowed to exotherm and then a temperature of 130° C. was established. After one hour at 130° C., the reaction mixture was cooled to 110° C. Dibutyltin dilaurate and oleic acid were added to the mixture and the mixture allowed to mix for five minutes at 110° C. The resin mixture (1700 parts) was dispersed in aqueous medium by adding it to a mixture of 37.19 parts of sulfamic acid and 1226.09 parts of deionized water. The dispersion was further thinned with 658.51 parts of deionized water and 667.17 parts of deionized water in stages and vacuum stripped to remove organic solvent to give a dispersion having a solids content of 45.01 percent and a particle size of 860 Angstroms.

RESIN EXAMPLE B

Describes the preparation of a cationic electrodeposition main vehicle containing dibutyltin dioleate, which was prepared in the same manner as Example A up to the addition of the organotin catalyst. For Example B, the dibutyltin dioleate was added to the mixture and the mixture allowed to mix for five minutes at 110° C. The resin mixture (1700 parts) was dispersed in aqueous medium by adding it to a mixture of 37.05 parts of sulfamic acid and 1213.38 parts of deionized water. The dispersion was further thinned with 655.65 parts of deionized water and 664.28 parts of deionized water in stages and vacuum stripped to remove organic solvent to give a dispersion having a solids content of 43.09 percent and a particle size of 900 Angstroms.

RESIN EXAMPLE C

Describes the preparation of a cationic electrodeposition main vehicle resin for a cationic electrodeposition bath that contains the dibutyltin oxide catalyst. The main vehicle resin was prepared in the same manner as Example A except that the successive addition of the crosslinker, the diketimine, and N-methyl ethanolamine involved a different crosslinker formulation than that of Example A. Also after this addition, the reaction mixture exothermed and a temperature of 132° C. was established and maintained for an hour. This resin mixture (1684 parts) was dispersed in aqueous medium by adding it to a mixture of 38.34 parts sulfamic acid and 1220.99 parts deionized water. The dispersion was further thinned with 657.63 parts deionized water and 666.28 parts deionized water in stages and vacuum stripped to remove organic solvent to yield a dispersion having a solids content of 41.2 percent and a particle size of 984 Angstroms.

RESIN EXAMPLE D

Describes the preparation of a cationic electrodeposition main vehicle resin for a cationic electrodeposition bath that contains the dibutyltin dioleate catalyst. The main vehicle resin was prepared in the same manner as Example B except that the resin mixture with the dibutyltin dioleate was dispersed as 1500 parts in aqueous medium by adding it to a mixture of 32.86 parts of sulfamic acid and 1081.42 parts of deionized water. The dispersion was further thinned with 580.95 parts of deionized water and 588.59 parts of deionized water in stages and content of 48.03 percent and a particle size of 890 Angstroms.

RESIN EXAMPLE E

Describes the preparation of a cationic electrodeposition main vehicle resin for a cationic electrodeposition bath that contains the dibutyltin dioleate catalyst. The main vehicle resin was prepared in the same manner as Example B except the dibutyltin dioleate was added to the mixture and the mixture allowed to mix for 15 minutes at 100° C. The resin mixture (368.23 parts) was dispersed in aqueous medium by adding it to a mixture of 8.27 parts of sulfamic acid and 262.7 parts of deionized water. The dispersion was further thinned with 142.5 parts of deionized water and 144.4 parts of deionized water in stages and vacuum stripped to remove organic solvent to give a dispersion having a solids content of 42.7 percent and a particle size of 976 Angstroms.

EXAMPLE I

Resin Examples A and B compare dispersion stability of cationic electrodeposition main vehicles each containing 0.6 percent tin on solids, containing dibutyltin dilaurate and dibutyltindioleate, respectively. The resins of Resin Examples A and B were placed in a 140° F. (60° C.) hot room. After 72 days, resin A had an obvious phase separation into two distinct layers. Resin B remained in one homogenous phase.

EXAMPLE II

Examples II-A through II-M compare dibutyltin oxide to various tin dicarboxylates, at equal tin level of 0.62% of main resin solids and 0.45% of total bath solids, in a cationic electrodeposition coating system.

EXAMPLE II-A

This example describes the preparation of a cationic electrodeposition bath containing dibutyltin oxide catalyst. The cationic electrodepositable main vehicle resin prepared in accordance with Example C of Table 1 above was prepared into a bath containing dibutyltin oxide catalyst in the following manner.

A pigment paste was prepared from the following ingredients:

| INGREDIENTS | PARTS BY WEIGHT |
|---|---|
| Pigment grinding vehicle[1] | 243.3 |
| Deionized water | 469.3 |
| Titanium dioxide[2] | 452.1 |
| Aluminum silicate[3] | 263.8 |
| Carbon black[4] | 22.4 |
| Basic lead silicate[5] | 95.1 |
| | 1546.0 |

[1]The pigment grinding vehicle was prepared by first preparing a quaternizing agent followed by reacting the quaternizing agent with an epoxy resin. The quaternizing agent was prepared as follows:

| INGREDIENTS | SOLUTION WEIGHT (GRAMS) | SOLIDS WEIGHT |
|---|---|---|
| 2-ethylhexanol half-capped toluene diisocyanate in MIBK | 320 | 304 |
| Dimethylethanolamine (DMEA) | 87.2 | 87.2 |
| Aqueous lactic acid solution | 117.6 | 58.2 |
| 2-butoxyethanol | 39.2 | — |

The 2-ethylhexanol half-capped toluene diisocyanate was added to the DMEA in a suitable reaction vessel at room temperature. The mixture exothermed and was stirred for one hour at 80° C. The aqueous lactic acid solution was then charged followed by the addition of 2-butoxyethanol. The reaction mixture was stirred for about one hour at 65° C. to form the quaternizing agent.
The pigment grinding vehicle was prepared as follows:

| INGREDIENTS | SOLUTION WEIGHT (GRAMS) | SOLIDS WEIGHT |
|---|---|---|
| EPON 829[a] | 710 | 682 |
| Bisphenol A | 289.6 | 29.6 |
| 2-ethylhexanol half-capped toluene diisocyanate in MIBK | 406 | 386.1 |
| Quaternizing agent described above | 496.3 | 421.9 |
| Deionized water | 71.2 | — |
| 2-butoxyethanol | 1490 | — |

[a]Diglycidyl ether of Bisphenol A available from Shell Oil and Chemical Co. The EPON 829 and Bisphenol A were charged under a nitrogen atmosphere to a suitable reactor and heated to 150° C. to 160° C. to initiate an exotherm. The reaction mixture was permitted to exotherm for one hour at 150° C. to 160° C. The reaction mixture was then cooled to 120° C. and the 2-ethylhexanol half-capped toluene diisocyanate added. The temperature of the reaction mixture was held at 110° C. to 120° C. for one hour followed by the addition of the 2-butoxyethanol. The reaction mixture was then cooled to 85° C. to 90° C., homogenized and charged with water followed by the quaternizing agent. The temperature of the reaction mixture was held at 80° C. to 85° C. until an acid value of about 1 was obtained. The final product had a solids content of about 57.1 percent.
[2]Available from E.I. du Pont de Nemours and Co. as R-900.
[3]Available from Engelhard Corp. as ASP-200.
[4]Available from Eagle-Picher Industries, Inc. as EP202.
[5]Available from Cabot Corporation as CSX-333 pellets.

The pigment paste was sand milled to Hegman reading of &. A dibutyltin oxide paste was prepared from the following ingredients:

| INGREDIENTS | PARTS BY WEIGHT |
|---|---|
| Pigment grinding vehicle of pigment paste | 137.9 |
| Dibutyltin oxide | 200.0 |
| Deionized water | 268.2 |
| | 606.1 |

The dibutyltin oxide paste was sand milled to a Hegman reading of 7. A cationic electrodeposition bath was prepared from the following ingredients:

| INGREDIENTS | PARTS BY WEIGHT |
|---|---|
| Main vehicle resin C of Table 1 | 1392.2 |
| Co-resin 1[6] | 171.0 |
| Butyl carbitol formal plasticizer[7] | 27.0 |
| Co-resin 2[8] | 74.5 |
| Deionized water | 1931.6 |
| Pigment paste prepared above | 179.2 |
| Dibutyltin oxide paste prepared above | 24.5 |
| | 3800.0 |

[6]An aqueous dispersion of a flexibilizer-flow control agent generally in accordance with U.S. Pat. No. 4,423,166 was prepared for use with the electrodepositable composition. The flexibilizer-flow control agent was prepared from a polyepoxide (EPON 828) and a polyoxyalkylene-polyamine (Jeffamine D-2000 from Texaco Chemical Co.) The flexibilizer-flow control agent was dispersed in aqueous medium with the aid of lactic acid and the dispersion had a resin solids content of 35.5 percent.
[7]The reaction product of 2 moles of diethylene glycol butyl ether and 1 mole of formaldehyde, prepared as generally described in U.S. Pat. No. 4,891,111.
[8]A cationic microgel prepared as generally described in Examples A and B of U.S. Pat. No. 5,096,556, with the exception that acetic acid instead of lactic acid, was used to disperse the soap of Example A, ethylene glycol butyl ether instead of MIBK was used as a solvent in the soap of Example A, and EPON 828 solution was added after stripping rather than before in Example B. The resin had a final solids content of 18.1 percent.

EXAMPLE II-B

The cationic electrodepositable main vehicle resin of Resin Example D of Table 1 was used in preparing a cationic electro-deposition bath containing dibutyltin dioleate catalyst in the following manner:

| INGREDIENTS | PARTS BY WEIGHT |
|---|---|
| Main Vehicle Resin D of Table 1 | 1277.1 |
| Co-resin 1 of Example II-A | 171.5 |
| Butyl carbitol formal plasticizer | 27.0 |
| Co-resin 2 of Example II-A | 74.8 |
| Deionized water | 2056.5 |
| Pigment Paste of Example II-A | 193.1 |
| | 3600.0 |

Main vehicle and electrodeposition baths were prepared as generally described in Example II-B; however, various dialkyl tin dicarboxylate catalysts reported in Table 2 below were added to the cationic main vehicle reaction mixture by cooling to 110° C. after the one hour at 130° C. amine hold, adding the catalyst, and mixing for five minutes before dispersion in aqueous medium.

The baths for the above examples were ultrafiltered, removing 20 percent of the total weight of the bath as ultrafiltrate and replacing the ultrafiltrate with deionized water. Zinc phosphate pretreated steel panels were immersed in the baths and electrocoated with the electrodepositable compositions at 275 volts for two minutes at a bath temperature of 87° F. to 95° F. (30.5° C. to 35° C.). After rinsing with deionized water, the panels were baked for 30 minutes at 310° F. (154.5° C.) and 340° F. (171.1° C.). Resulting film builds were about 0.9 mils (22.9 microns). The cured coatings were evaluated for appearance as measured by the surface profile ($R_A$) described below and for cure response as measured by acetone resistance. Results are reported in Table 2.

Samples of the main vehicles of Examples II-B through II-K were observed on aging at room temperature and in a 140° F. (60° C.). Example II-K separated into two phases after five days at both temperatures of room temperature and 140° F. (60° C.) Example II-C separated into two phases after 82 days at room temperature. Example II-B began developing sediment after 99 days at room temperature. All remaining samples remained stable at room temperature after 99 days. Examples II-B through II-J developed slight sediment after 99 days at 140° F. (60° C.). These results are included on Table 2.

TABLE 2

Comparison of Catalysts at 0.45% Tin on Total Bath Solids or 0.6% of Main Vehicle

| Example No. | Catalyst | ELECTRO-COATED BATH MAIN VEHICLE PROPERTIES | | STABILITY | |
|---|---|---|---|---|---|
| | | $R_A$[1] | Acetone Resistance[2] | Room Temperature | 140° F. |
| II-A | Dibutyltin oxide | 11.5 | 20 | NA[3] | NA[3] |
| II-B | Dibutyltin dioleate | 8.3 | >100 | 99 days | 99 days |
| II-C | Dibutyltin dilaurate | 8.5 | >100 | 82 days | 99 days |
| II-D | Dibutyltin dipalmitate | 15.6 | >100 | >99 days | 99 days |
| II-E | Dibutyltin monooleate monoacetate | 7.8 | >100 | >99 days | 99 days |
| II-F | Dibutyltin distearate | 18.2 | >100 | >99 days | 99 days |
| II-G | Dibutyltin dimyristate | 13.2 | >100 | >99 days | 99 days |
| II-H | Dibutyltin monooleate | 9.0 | 95 | >99 days | 99 days |
| II-I | Dioctyl tin dioleate | 12.6 | >100 | >99 days | 99 days |
| II-J | Dibutyltin diester of octadecadienoic acids[4] | 9.7 | >100 | >99 days | 99 days |
| II-K | Dibutyltin diacetate | 20.8 | >100 | 5 days | 5 days |

[1]Data obtained from panels coated in baths aged two (2) weeks. Relative roughness of the coating surface is measured with a Surfanalyzer, Model 21-9010-01, Federal Products, Inc. The number reported is the average roughness, or the average vertical distance of any point on the surface from a centerline determined by a stylus moving across the surface, expressed in micro-inches. Lower numbers indicate greater smoothness. These data were obtained from panels cured for 30 minutes at 340° F. (171° C.).
[2]An acetone saturated cloth was firmly rubbed back and forth across the cured coating surface. The number reported is the number of double rubs required to expose the metal surface. These data were obtained from panels cured for 30 minutes at 310° F. (154.5° C.).
[3]NA is "Not Applicable" since the dibutyltin oxide was added as the catalyst in the conventional manner in the form of a paste to prepare the electrodeposition bath.
[4]Commercially available as 9-11 acids from NL Industrial Chemicals of Hightstown, New Jersey which is 9, 11 and 9, 12 octadecandienoic acids.

EXAMPLE III

Example III illustrates that a combination of dibutyltin oxides and dibutyltin dioleate can be used to give good properties at a reduced total tin content of 0.34 percent of total bath solids.

A cationic pigment paste was prepared from the following ingredients:

| INGREDIENTS | PARTS BY WEIGHT |
|---|---|
| Pigment grinding vehicle of Example II-A | 1200.0 |
| Deionized water | 2209.6 |
| Titanium Dioxide of Example II-A | 2271.4 |
| Aluminum silicate of Example II-A | 1325.4 |
| Carbon black of Example II-A | 112.8 |
| Basic lead silicate of Example II-A | 477.8 |
| Dibutyltin oxide paste of Example II-A | 403.0 |
| | 8000.00 |

The paste was sand milled to a Hegman reading of 7 and a solids of 60 percent.

A cationic electrodeposition bath was prepared from the following ingredients:

| INGREDIENTS | PARTS BY WEIGHT |
|---|---|
| Main vehicle Resin E of Table above | 1346.8 |
| Co-resin 1 of Example II-A | 171.5 |
| Butyl carbitol formal plasticizer | 27.0 |
| Co-resin 2 of Example II-A | 74.8 |
| Deionized water | 1977.5 |
| Pigment paste prepared above | 202.4 |
| | 3800.0 |

The bath was ultrafiltered 20 percent replacing with deionized water as described in Example II. A zinc phosphated steel panel was electrocoated for 275 volts for two minutes at 89° F. for 0.95 mil film build baked 30 minutes at 310° F. (154° C.), acetone resistance as described in Example II was>100, double rubs. Stirred two weeks, electrocoated and baked for 30 minutes at 340° F. (171° C), its $R_A$ as described in Example II was 8.4 µ-in.

EXAMPLE IV

This example describes a bath with 0.45 percent tin on total solids, where the dibutyltin dioleate was added as a separate microfluidized fatty amine emulsion, and subsequently used in combination with dibutyltin oxide.

| INGREDIENTS | PARTS BY WEIGHT |
|---|---|
| Rhodameen C-5 | 165 |
| Water | 2310 |
| Acetic acid | 16 |
| Dibutyltin dioleate | 825 |

Acetic acid was added to a mixture of Rhodameen C-5 and water at room temperature to pH 6. Dibutyltin dioleate then was added to the mixture and the emulsion was subjected to microfluidization (20,000 psi, 1 pass). This resulted in stable emulsion of dibutyltin dioleate. Solids was 29.9 percent.

A cationic electrodeposition bath was prepared from the following ingredients:

| INGREDIENTS | PARTS BY WEIGHT |
| --- | --- |
| Main vehicle of Resin Example C of Table 1 | 1372.0 |
| Co-resin 1 of Example II-A | 171.5 |
| Butyl carbitol formal plasticizer | 27.0 |
| Co-resin 2 of Example II-A | 74.8 |
| Deionized water | 1929.0 |
| E6066 pigment paste* | 125.4 |
| Pigment paste of Example II-A | 67.5 |
| Emulsion prepared above | 32.8 |
| | 3800.0 |

*A Pigment paste commercially available from PPG Industries Inc. which has 27.2% $TiO_2$, 1.4% carbon black, 15.9% aluminum silicate, 5.7% basic lead silicate, and 3.8% dibutyltin oxide.

The bath was ultrafiltered 20 percent, replacing with deionized water as described in Example II. A zinc phosphate steel panel was electrocoated for 275 volts for two minutes at 86° F. for 0.93 mil film build. Baked 30 minutes at 310° F. (154° C.), acetone resistance as described in Example II was>100 double rubs. Stirred two weeks, electrocoated, and baked 30 minutes at 340° F. (171° C.); its $R_A$ as described in Example II was 7.8 μ-in.

We claim:

1. An electrodepositable composition comprising (a) active hydrogen-containing, cationic salt group-containing resin electrodepositable on a cathode; (b) capped polyisocyanate curing agent; and (c) diorganotin dicarboxylate; wherein the dicarboxylate is at least one long chain carboxylate having from 14 to 22 carbon atoms and the diorganotin dicarboxylate is present in the electrodepositable composition in an amount of at least 0.01 percent by weight tin based on weight of total solids of the electrodepositable composition.

2. The electrodepositable composition of claim 1 in which the active hydrogen-containing, cationic salt group-containing resin is derived from a polyepoxide.

3. The electrodepositable composition of claim 2 in which the polyepoxide is a polyglycidyl ether of a polyhydric alcohol.

4. The electrodepositable composition of claim 2 in which the cationic salt groups are amine salt groups.

5. The electrodepositable composition of claim 4 in which the amine salt groups are derived from basic nitrogen groups neutralized with an acid selected from the group consisting of formic acid, acetic acid, lactic acid, phosphoric acid, sulfamic acid, and mixtures thereof.

6. The electrodepositable composition of claim 1 in which the long chain carboxylate has from 14 to 18 carbon atoms.

7. The electrodepositable composition of claim 1 in which the long chain carboxylate has from 16 to 18 carbon atoms.

8. The electrodepositable composition of claim 1 in which the dicarboxylate is at least one long chain carboxylate selected from the carboxylate derivatives of the group consisting, of oleic acid, palmitic acid, stearic acid, myristic acid, 9,11-octadecadienoic acid, and mixtures thereof.

9. The electrodepositable composition of claim 8 in which the long chain carboxylate is from oleic acid.

10. The electrodepositable composition of claim 1 in which the dicarboxylate is a one long chain carboxylate having from 14 to 22 carbon atoms and one carboxylate having less than 13 carbon atoms.

11. The electrodepositable composition of claim 1 in which the dicarboxylate is comprised of a mixture of one or more long chain carboxylates having from 14 to 22 carbon atoms and one or more carboxylates having less than 13 carbon atoms.

12. The electrodepositable composition of claim 1 in which the organo groups in the diorganotin dicarboxylate are butyl groups.

13. The electrodepositable composition of claim 1 in which the diorganotin dicarboxylate is a reaction product of at least one long chain carboxylate having from 14 to 22 carbon atoms and dibutyltin oxide, reacted in a mole ratio greater than about 1:1

14. The electrodepositable composition of claim 1 in which the active hydrogen-containing, cationic salt group-containing resin is present in amounts of about 50 to 75 percent by weight, based on weight of main vehicle resin solids.

15. The electrodepositable composition of claim 1 in which the capped polyisocyanate curing agent is present in amounts of about 25 to 50 percent by weight, based on weight of main vehicle resin solids.

16. The electrodepositable composition of claim 1 in which the diorganotin dicarboxylate is present in amounts of about 0.01 to 1.5 percent tin by weight, based on weight of total solids of the electrodepositable composition.

17. The electrodepositable composition of claim 16 which contains lead.

18. The electrodepositable composition of claim 1 which is curable at a temperature range of about 300° F. to 340° F. (148.8° C. to 171.1° C.).

19. The electrodepositable composition of claim 1 in which the diorganotin dicarboxylate is a liquid at room temperature.

20. The electrodepositable composition of claim 1 which further contains dibutyltin oxide.

21. The electrodepositable composition of claim 1 in which the diorganotin dicarboxylate is incorporated into the electrodepositable composition in the form of a stable homogenized emulsion.

* * * * *